United States Patent [19]

Benveniste

[11] Patent Number: 5,345,499

[45] Date of Patent: Sep. 6, 1994

[54] METHOD FOR INCREASING TWO TIER MACROCELL/MICROCELL SUBSCRIBER CAPACITY IN A CELLULAR SYSTEM

[75] Inventor: Mathilde Benveniste, South Orange, N.J.

[73] Assignee: AT&T Bell Laboratories, Murray Hill, N.J.

[21] Appl. No.: 855,403

[22] Filed: Mar. 23, 1992

[51] Int. Cl.$^5$ .......................................... H04M 11/00
[52] U.S. Cl. ........................................ 379/59; 379/60; 455/33.2
[58] Field of Search ....................... 379/58, 59, 60, 63; 455/33.1, 33.2, 54.1, 54.2, 56.1

[56] References Cited

U.S. PATENT DOCUMENTS 5,175,867 12/1992 Wejke et al. ...................... 379/60 X
5,239,667 8/1993 Kanai .................................. 379/60 X
5,278,991 1/1994 Ramsdale et al. ................. 379/60 X

FOREIGN PATENT DOCUMENTS 0143725 6/1990 Japan .................................. 455/33.1

OTHER PUBLICATIONS

*ETSI GSM2*, Ronneby, Sep. 17–20, 1991, Tdoc 113/91 entitled "Idle Mode Cell Reselection for Microcells".

*Primary Examiner*—Curtis Kuntz
*Assistant Examiner*—G. J. Oehling
*Attorney, Agent, or Firm*—Alfred G. Steinmetz

[57] ABSTRACT

A method for enabling the service of mobiles by a microcell, in a two tier cellular system, involves identifying a microcell coverage area and offsetting microcell signal strength for a time sufficient to allow a fast moving vehicle, desiring service and having entered the microcell serving area, to exit the microcell coverage area before the call is set up or handed off forcing the controlling macrocell to handle the call setup or handoff. Hence, only the mobile radiotelephones of stationary and relatively slow moving vehicles are served by the microcell. There is a substantially offset-coverage overlap period between the locations where a mobile may be found during the offset interval or duration of the apparent reduced signal strength of the microcell and the microcell coverage area. Calls that could be serviced by the microcell are instead serviced by the macrocell because the mobile radiotelephone responds to the strongest signal. This loss in capacity is solved by reducing the offset-coverage overlap. Offset-coverage overlap is reduced by starting the offset or timed duration of a delay enablement signal at some predetermined point before the mobile enters the microcell coverage area and by increasing the length of the offset duration or interval by some predetermined increment to prevent service by the microcell to a vehicle exceeding a cutoff speed. For slow moving vehicles there is a net shift to a reduced offset period within the microcell coverage area and hence proportionately more call set up and handoff requests of slow moving vehicles can be accommodated.

9 Claims, 6 Drawing Sheets

METHOD FOR INCREASING TWO TIER MACROCELL/MICROCELL SUBSCRIBER CAPACITY IN A CELLULAR SYSTEM

FIELD OF THE INVENTION

This invention relates to wireless and/or cellular radiotelephone systems having two tier service areas with a primary controlling macrocell site and a plurality of microcell sites under the control of the macrocell site. It is particularly concerned with systems in which service within the microcell serving area is in part defined by the velocity of the mobile radiotelephone.

BACKGROUND OF THE INVENTION

Increasing the subscriber capacity of a cell site in a wireless and/or cellular radiotelephone system has traditionally involved a splitting of the cell site into a new pattern of a greater number of smaller cells to replace the previously existing cell pattern. An alternative arrangement to avoid the necessity for new cell sites has been to create a plurality of microcell sites within the existing "macrocell" site. The microcell sites each comprise radio transceiver stations all connected to the existing macrocell site. They are distributed throughout the serving area of the existing macrocell and are used to improve overall traffic capacity. These remote transceiver stations or microcells function as "repeaters" or "radiators" in interconnecting mobile subscribers (MSs) and the macrocell sites. These microcells handle rf signals sent to and from mobile radiotelephone units which they retransmit for communication with the macrocell stations.

In a cellular radiotelephone service area comprising a macrocell and a plurality of microcells, it is desirable that MSs set up calls in the microcell in preference to the macrocell to improve traffic capacity. The MS radiotelephone normally selects the serving macrocell or microcell for call setup service based on signal strength. Fast moving vehicles with radiotelephones cannot be served by microcells, however, since these vehicles would be outside the microcell coverage area before a call could be set up or handed off.

A method has been proposed for selectively enabling the service of MSs by a microcell by selecting the MSs based on their speed. It involves identifying a microcell coverage area and offsetting microcell signal strength or perceived strength, as detected by an idle MS, for a time sufficient to allow a fast moving MS, desiring service and having entered the microcell serving area, to exit the microcell coverage area before the call is set up thereby forcing the controlling macrocell to handle the call setup. Hence only the MS radiotelephones of pedestrian-held stationary radiotelephones and radiotelephones in relatively slow moving vehicles are served by the microcell. Such a system is discussed in ETSI GSM2, Ronneby, Sep. 17–20, 1991; Tdoc 113/91 entitled "Idle Mode Cell Reselection for Microcells."

There is a substantial offset-coverage overlap between the locations where a MS may be found during the offset interval or duration of the apparent reduced signal strength of the microcell and the microcell coverage area. For example, a slow moving vehicle may enter the microcell coverage area and not be serviced by the microcell if the request for a call setup is initiated during the offset interval even though the MS still has a substantial distance to go within the microcell coverage area. Calls that could be serviced by the microcell are instead serviced by the macrocell because the mobile radiotelephone is programmed to respond to the strongest signal. This proposed call setup arrangement results in a proportion of the call setups, that would be served by the microcell, being lost to the present macrocellular system since a call set up in the macrosystem may not be subsequently handed off to a microcell system in the incident macrocell system. It is desirable to reduce this capacity loss because of the spectrum utilization efficiency of a microcellular system.

SUMMARY OF THE INVENTION

This loss in capacity is decreased by reducing the offset-coverage overlap. Offset-coverage overlap is the overlap in area between where a MS may be positioned during the period of offset or timed duration of reduced microcell signal strength and the microcell coverage area. Offset-coverage overlap is reduced by starting the offset period or timed duration at some predetermined point before the MS enters the microcell coverage area and by increasing the length of the offset duration or interval by some predetermined increment to prevent service by the microcell to a vehicle exceeding a defined cutoff speed. Such a cutoff speed is the speed designated herein as a fast speed $v_F$ at which service is not extended to the mobile radiotelephone. For slow moving MSs traveling below the cutoff speed (i.e. at a speed $v_S$ below a cutoff speed $v_F$) there is a net reduction to the portion of the offset period where the slow moving MS is within the microcell coverage area and hence proportionately more call setup requests of slow moving MSs can be accommodated by the microcellular system.

The offset duration is triggered by the level of the signal received by the idle MS radiotelephone. The offset duration is extended, according to the invention, to reduce overlap between the area of microcell coverage and the geographical area in which the offset signal is received by a slow moving MS. Hence a MS moving at or above the cutoff speed leaves the microcell before or upon expiration of the offset duration but for slower moving MSs, moving below the cutoff speed, the offset duration expires while the MS radiotelephone has more time left within the microcell coverage area allowing more calls to be set up with the microcell. Hence, the subscriber capacity loss allowed by the original prior method of cell selection is reduced.

In an illustrative embodiment of the invention, a MS radiotelephone has an internally set signal level threshold at which it responds to a signal transmitted by a plurality of candidate macrocells and microcells. Such signals are broadcast to MSs on a special broadcast control channel (BCCH). In a system defined by GSM standards such a signal would be broadcast on the BCCH of the microcell and the MS would respond at a specified offset signal threshold. This specified signal threshold is set at a signal level value or offset trigger value so that the MS radiotelephone responds to the broadcast signal at a distance substantially in advance of entering the designated service coverage area of the microcell station. Upon acceptance of the broadcast signal, the MS radiotelephone is effectively disabled from a call being set up with the microcell station for an offset duration or specific timed duration. In a particular arrangement the microcell's broadcast signal strength is treated as if its broadcast signal strength is significantly reduced for the offset duration. The offset is applied to force MS radiotelephones moving at cutoff speed $v_F$ off the microcellular system since such MSs would not have sufficient time in the coverage area of the microcell to permit call set up and hand off. MS radiotelephones traveling at or in excess of this speed are disabled from initiating a call setup with the microcell station.

This specific offset or timed duration has a preselected value to enhance the probability of a call setup being completed within the microcell by MS radiotelephones moving at a slow speed $v_s$ below the cutoff speed $v_F$. An added enhancement to the arrangement allows individual MS radiotelephones to be identified according to their expectant speed. Hence the microcell may be programmed to respond to this identity to deny call setup permission to idle MSs (e.g. such as motor vehicles) that may be expected to move at high speeds.

DETAILED DESCRIPTION

Figure 1:
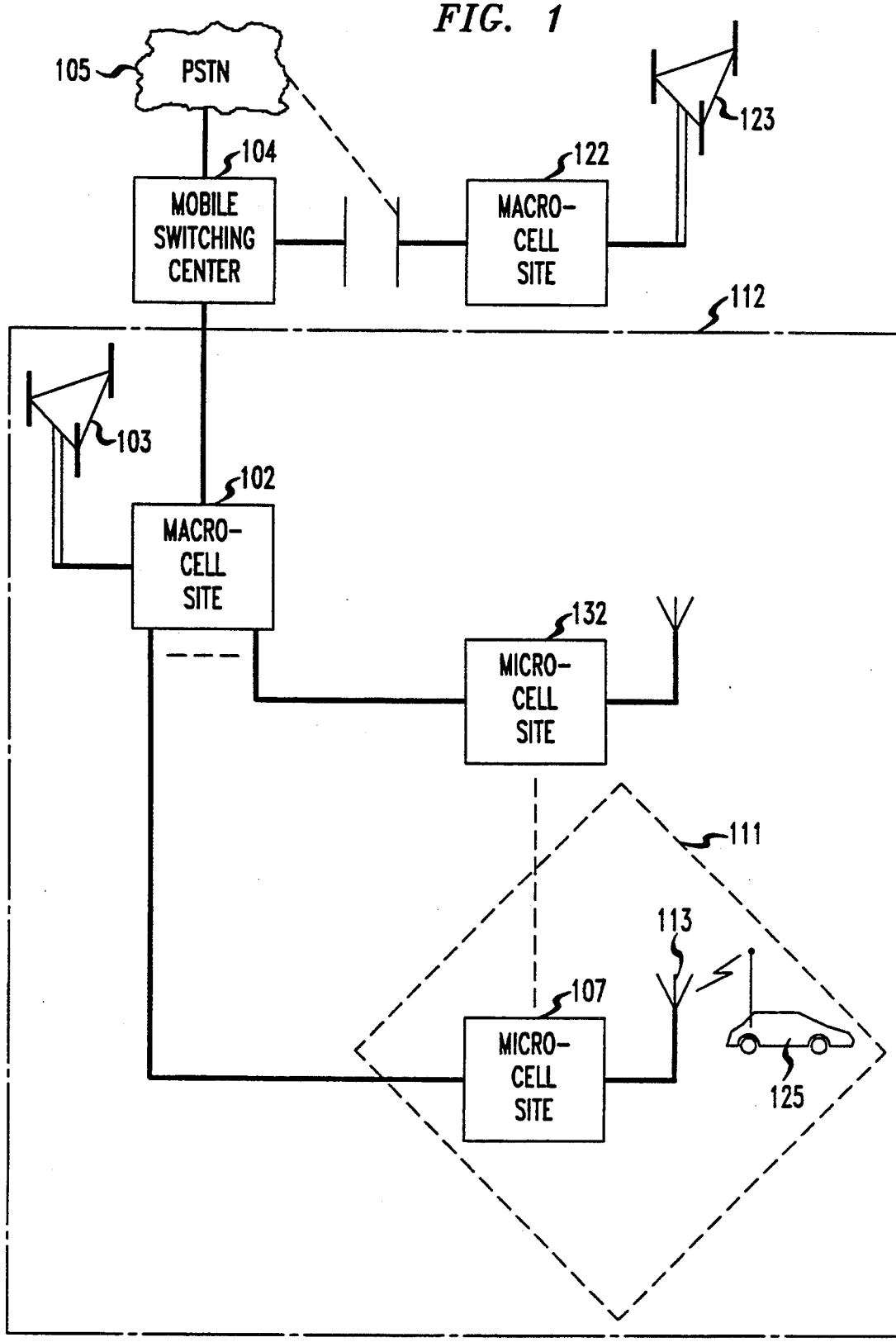
FIG. 1 is a schematic of a mobile radiotelephone service area comprising a macrocell and a plurality of satellite microcells.

A cellular or wireless telephone service arrangement is shown in the FIG. 1. A macrocell station 102 is connected to a mobile switching center 104 (MSC) which interconnects the macrocell station 102 to a public switched land telephone network 105. The macrocell station 102 includes an antenna 103 to radiate a service area 112, defined by a dotted line, and provide mobile telephone service to MS radiotelephones 125 within its serving area. Other service areas are served by other macrocell stations such as the station 122 with the antenna 123. This macrocell station 122 may be connected to the MSC 104 or the MSC of a competing serving area in order to connect the MS radiotelephone to the public switched land telephone network 105.

The macrocell 102 is connected to a microcell station 107 located within its nominal serving area 112, with a service area 111 defined by the dash-dot line. The microcell station 107 includes an antenna 113 to radiate the serving area 111. It operates under control of the macrostation 102 and is essentially a satellite transmitting and receiving station.

The microcell station site 107 is included to better serve a small subservice area 111, which is not well served by the radiation of antenna 103. Hence a MS radiotelephone 125 within the service area 111 may be better served by a call setup made with the microcell station 107 rather than with the macrocell station 102.

Due to the small size of the service area 111, the MS radiotelephone may be in a vehicle traveling at a speed that does not permit the completion of a call setup and handoff before the MS radiotelephone leaves the area 111 covered by the microcell station 107. For this reason it is desirable to prevent the microcell from setting up a call for a MS radiotelephone in such a vehicle. One method of achieving this result is graphically shown in the diagram of FIG. 2, which schematically shows a microcell and a typical coverage area 212, as defined by the dotted line. The microcell station 207 is shown located at the intersection of two roadways 231 and 232. The coverage area 212 is approximated schematically as a diamond shape since the presence of buildings causes lower signal attenuation along the two main artery roadways 231 and 232.

The microcell station transmits a broadcast signal (i.e., broadcast on the BCCH of that cell) having a signal strength which compared with a signal detection threshold of the MS radiotelephone starts a timed duration $T_O$ at the moment the mobile radiotelephone arrives at the entry point 213 of the coverage area 212. A call setup to the microcell station 207 will not occur if the timed duration expires contemporaneous with or after the mobile radiotelephone exits the coverage area 212.

A fast moving MS 225, moving at a fast velocity $v_F$, is shown arriving at the boundary of the microcell coverage area 212, at the entry point 213. Upon arrival at the entry point 213, the MS radiotelephone responds to the broadcast signal and starts the measured timed duration $T_O$. The distance the MS covers $T_O * v_F$, takes it to the point 235 at the end of the duration $T_O$ and hence the fast moving MS is not serviced by the microcell 207 for a call setup.

A slow moving MS 226 also responds to the broadcast signal when it arrives at the entry point 213. The distance the slow moving MS covers is defined by $T_O * v_s$, and at the end of the duration $T_O$ the slow moving MS is at point 236 well within the defined coverage area. Hence a call setup of a call with a MS radiotelephone of a slow moving MS, occurring at a location to the right of point 236 in FIG. 2, may be serviced by the microcell.

Figure 2:
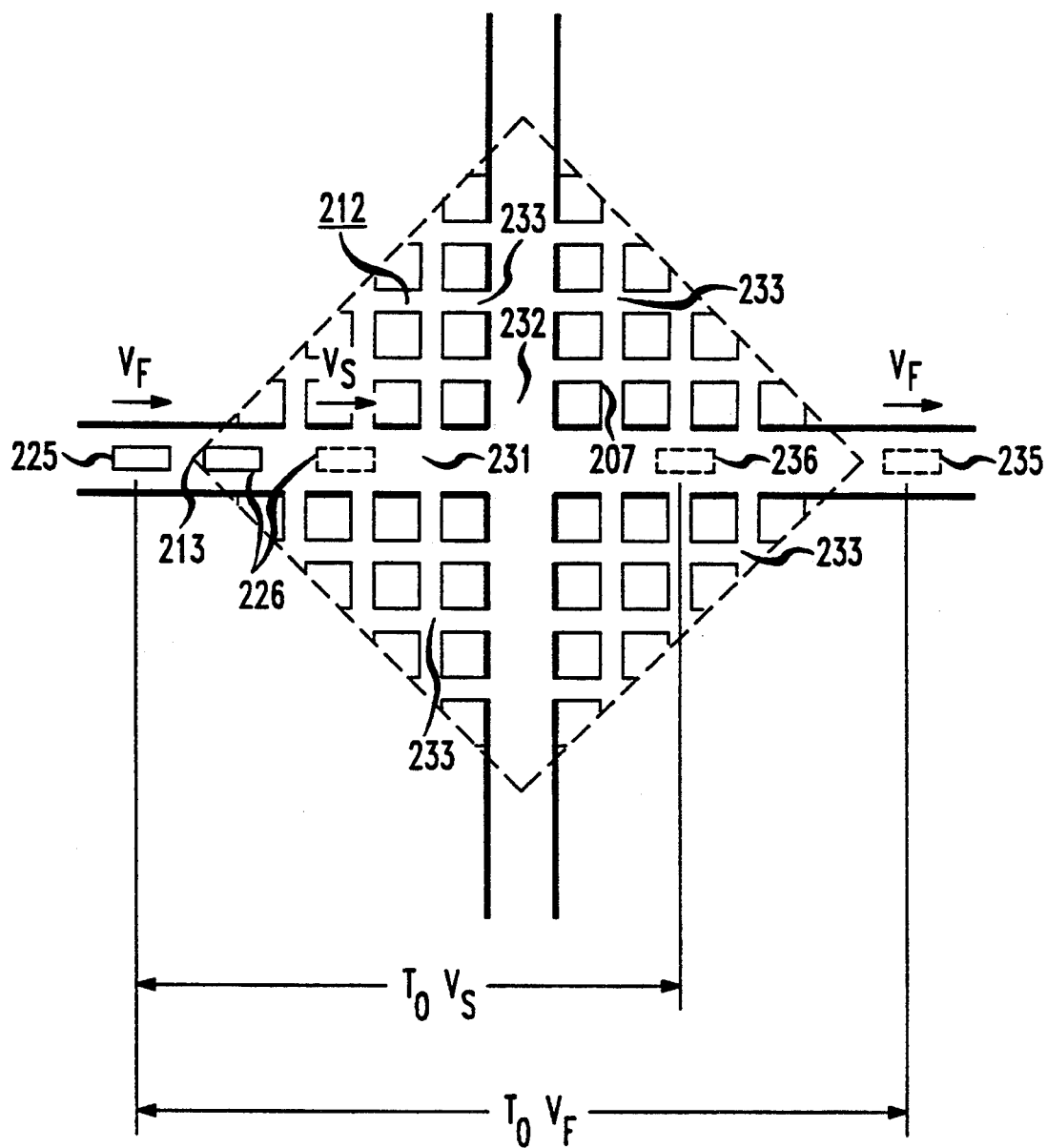
FIG. 2 is a diagram of a microcell service area in which service to mobiles is dependent on speed of the mobile.

The effect of limiting the access to the microcell to slow moving or stationary radiotelephones according to the prior art arrangement of FIG. 2 is to reduce the traffic carried by the microcell below its capacity thereby losing subscriber traffic for that microcell station. There is substantial overlap between the area where a MS may be found during the interval of the offset or timed duration period and the microcell coverage area. This loss in capacity is defined by the following expression of call loss probability;

$$Prob[Q < T_O] = 0.7206(T_O * v_s)/R - 0.1103[(T_O * v_s)/R]^2$$

Q is the time interval from entry of an MS into a microcell coverage area until a call initiation; and R is the radius of the microcell (see FIG. 2).

If $T_O = 2R/v_F$, all calls of MSs with a speed equal to or exceeding the cutoff speed $v_F$ are lost to macrocellular system.

These calls must be set up in an adjacent macrocell system. Assuming a microcell coverage area where $2R = 600$ meters and a cutoff speed of 15.5 km/hr, 43% of mobiles traveling at 5 km/hr would be lost to the controlling macrocell. Seventy-six percent of mobiles traveling at 10 km/hr would be lost to the controlling macrocell. At 15 km/hr, 99% of the mobiles would be lost to the macrocellular system.

Figure 3:
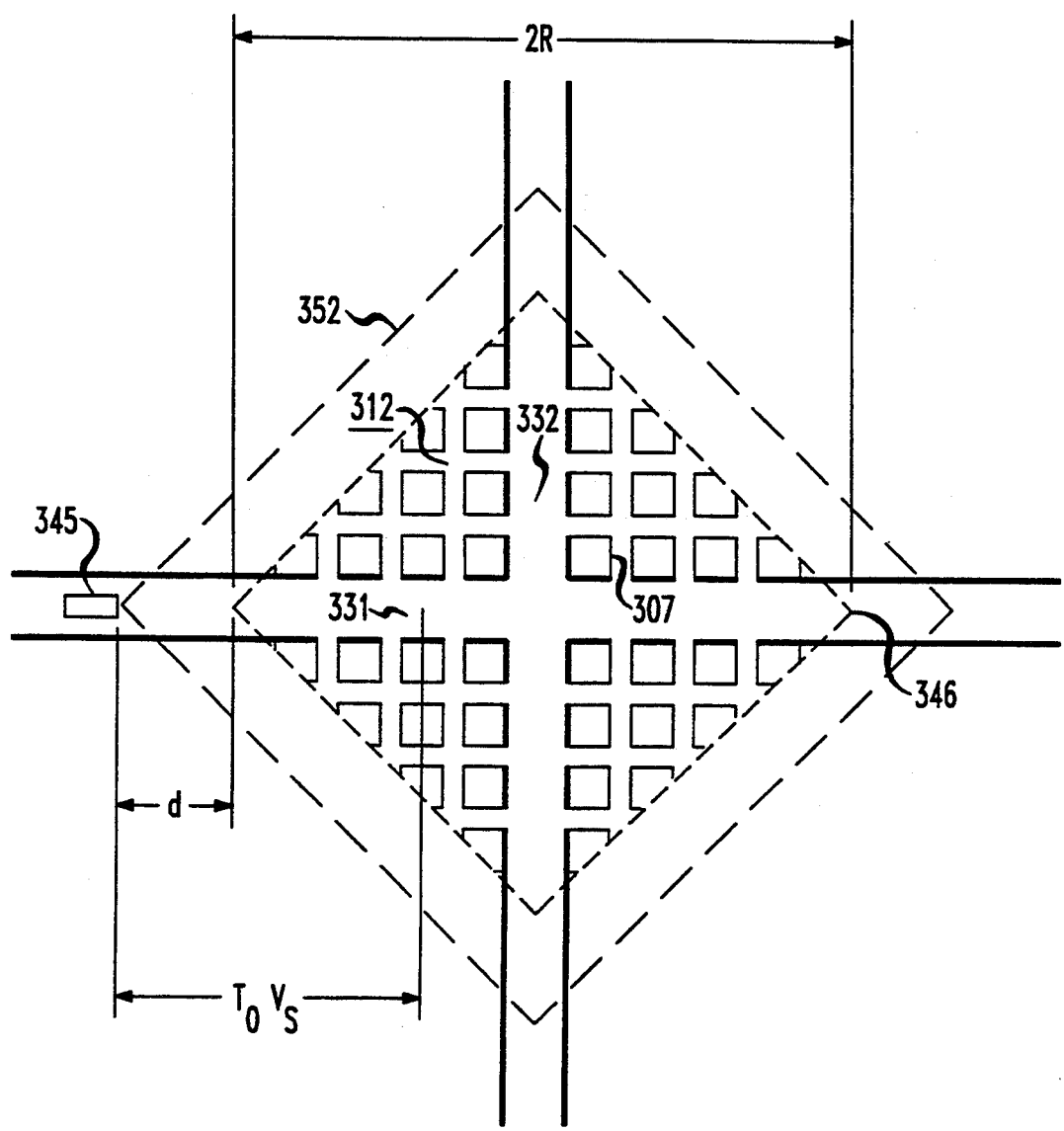
FIG. 3 is a diagram of a microcell service area in which service to MSs is dependent on speed of the MS radiotelephone and in which the subscriber capacity is increased by reducing offset duration-coverage overlap.

An embodiment, incorporating the principles of the invention, operative to reduce this capacity loss is shown in the arrangement shown in FIG. 3. The objective is to reduce the overlap between the timed offset duration established by a mobile radiotelephone and its time of travel within the microcell coverage area in order to increase the capacity handled by the microcell.

The microcell coverage area 312, shown by the dotted line in the schematic of FIG. 3, depicts the normal operating area for the microcell station 307 located at the intersection of the two major roadways 331 and 332. MSs can move along the major roadways or along any of an additional grid at roadways 338 within the microcell coverage area 312. The threshold of response by MS radiotelephones to the microcell broadcast signal is set at a level so that the response occurs at the limits defined by the boundary line 352, in advance of reaching the coverage area of the microcell, set at a specific distance "d" from the boundaries of the microcell coverage area. This threshold level is lower than the threshold level used in the example of FIG. 2 so that the MS radiotelephone responds prior to entry into the microcell coverage area.

A MS 345 is shown reaching the boundary line 352 at which time the offset timed duration is initiated in response to the broadcast signal. The MS 345 reduces the perceived signal strength of the microcell for the interval of this timed duration. If the MS 345 is a fast moving vehicle (i.e. moving at or greater than cutoff speed), the timed duration will not expire until the MS has exited the microcell coverage area 312 at point 346 and the call setup will be relegated to a macrocell station. In the case of a slow moving vehicle the offset or timed duration expires before the MS enters significant penetration of the microcell coverage area 312 and a call setup for a call initiated at a location to the fight of the penetration point 331 is permitted.

The ideal offset timed duration $T_{Max}$ is determined by the time needed by a slow moving MS to traverse the distance "d" shown in the FIG. 3. The ideal value for the term $T_{Max}$ is defined by the relation;

$$T_{Max} = 2R/(v_F - v_s).$$

This particular ideal duration $T_{Max}$ may not be suitable in some cases because this value for the duration may require a broadcast signal level below the lowest signal level which the MS radiotelephone may find perceptible.

A more suitable value for $T_O$ is selected to equal an offset duration that defines a broadcast signal detection level equal to a perception level of the MS radiotelephone. This value for $T_O$ is defined by the expression;

$$T = (10^{\delta/10\gamma} + 1)\frac{R}{V_F}$$

where $\delta$ represents the signal propagation loss between the microcell coverage area and a trigger point representing a signal level at which the MS radiotelephone responds to the broadcast signal. The MS response to the trigger signal initiates timing of the offset duration.

$\gamma$ represents the propagation loss rate between the trigger point and coverage area entry point.

The probability of call loss is given by the expression:

$$Prob[Q < T_O - e] = 0.7206[(T_O - e)^* v_s/R] - 0.1103[(T_O - e)^* v_s/R]^2$$

where "e" is given by the relation;

$$e = d/v_s = (T_O^* v_F - 2R)/v_s$$

and "d" is given by the relation;

$$d = T_O^* v_F - 2R$$

where:

2R is the maximum travel path within the cell coverage area.

Figure 4:
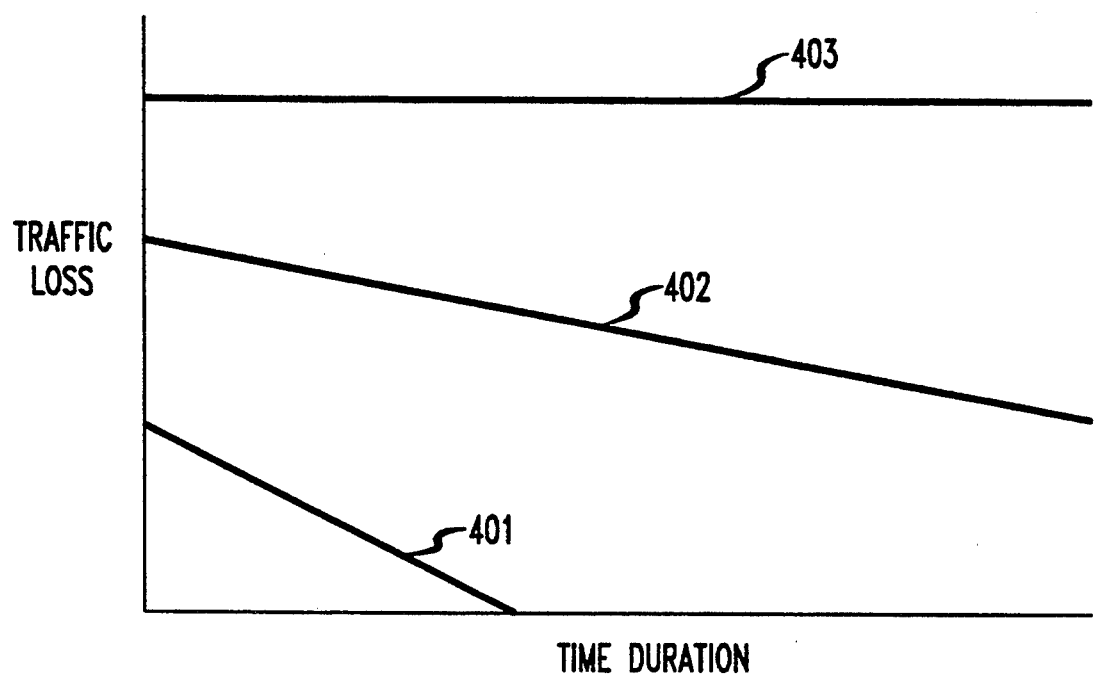
FIG. 4 is a graph displaying velocity relative subscriber capacity loss versus timed duration of the offset period.

A graphical display of capacity loss versus timed duration for various vehicle speeds is shown in the graph of FIG. 4. Curve 401 represents a very slow moving mobile radiotelephone. Curve 402 represents a medium speed mobile radiotelephone, and curve 403 represents a fast moving vehicle that is not served by the microcell station.

Figure 5:
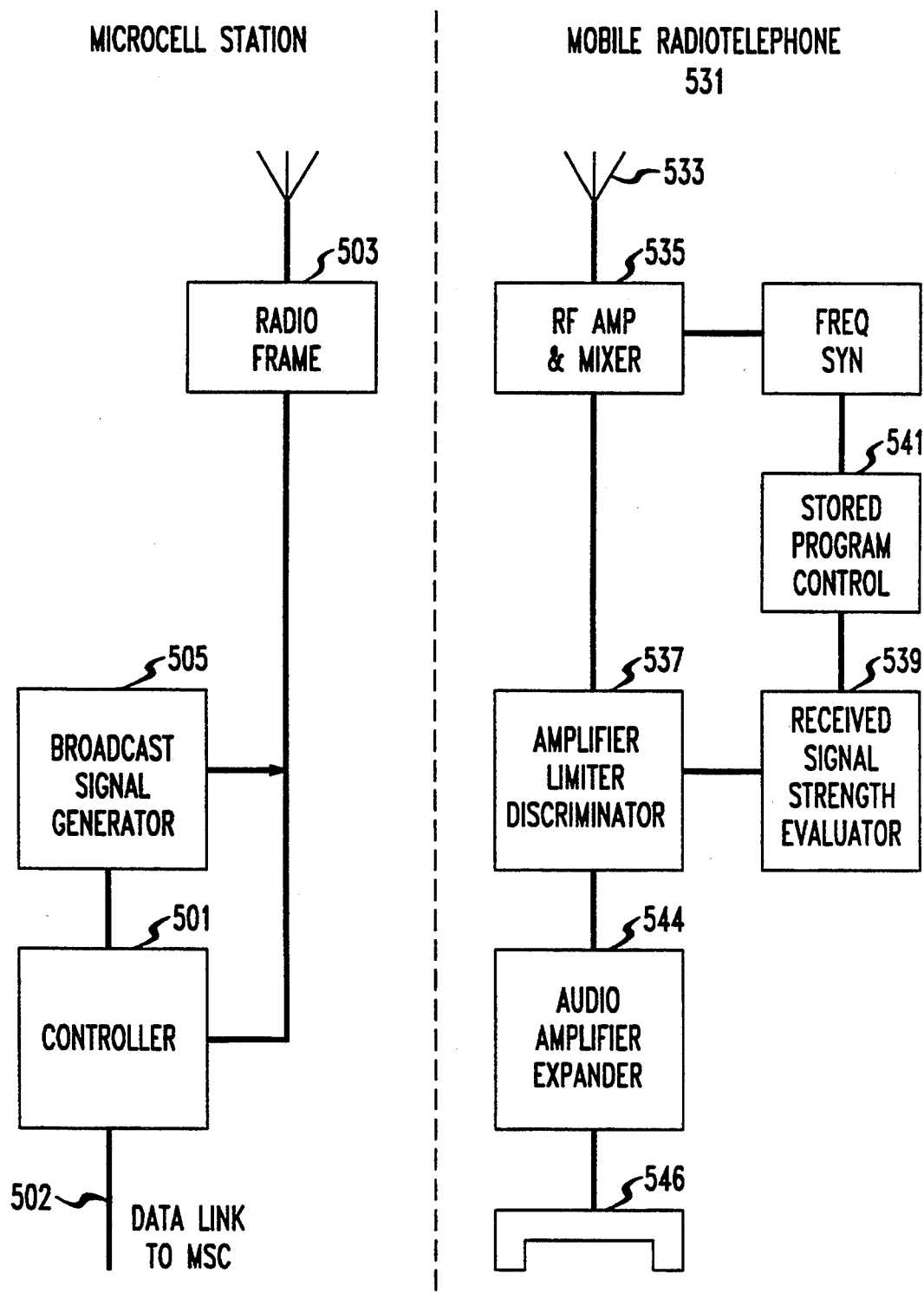
FIG. 5 is a block schematic of apparatus for implementing an illustrative embodiment of the invention.

An illustrative embodiment of a radiotelephone and microcell station in a cellular system is shown in the block diagram of FIG. 5. A controller 501 under direction of a stored program is connected, via a link 502, to communicate with the controlling macrocell. The controller 501 applies voice and data signals from the macrocell and control signals to the radio frame 503 which comprises radio transceivers and associated equipment. The transceivers of the radio frame 503 operate through a radio antenna which radiates a small area served by the microcell station.

A signal generator 505 generates broadcast signals for transmission under control of the controller 501. Such a code when accepted by the MS radiotelephone initiates a timed offset duration during which the microcell signal is perceived by the MS radiotelephone as significantly reduced in signal strength. The output of the signal generator 505 is connected to a selected transmitter of the radio frame 503 so that these broadcast signals are broadcast to a geographical area exceeding the area of normal coverage of the microcell.

An idle mobile radiotelephone unit 531 that might be served by the microcell station receives these broadcast signals on an antenna 533 and applies them to a RF amplifier and mixer circuit 535. A mixing frequency signal is supplied by a frequency synthesizer controlled by a stored program control 541. The MS radiotelephone may include identification indicia that specifies it as not to be serviced by the microcell. It may totally bar service to certain types of MS radiotelephones or restrict service to certain specified time periods. In another arrangement the MS may be given the initiative of providing such indicia by entering a command into the MS radiotelephone.

The RF amplifier and mixer circuit is connected to an amplifier limiter and discriminator circuit 537. Its output is applied to an audio amplifier and expander 544 which in turn is connected to a handset 546.

A signal strength evaluator 539 is connected to the amplifier limiter and discriminator circuit 537. Signal strength evaluator is connected to a stored program control 541 which is operative in response to stored instructions to evaluate various broadcast and control signals and evaluate the strength of those signals relative to some acceptance threshold. The stored program control 541 provides the thresholds required by the different signals and in the case of the broadcast signal identifies its receipt and initiates an offset duration.

The MS radiotelephone may have specific identification indicia which identifies it as being unsuitable for a call setup in a microcell since it typically moves at a fast speed. Any MS radiotelephone so identified is not accorded a call setup. Such a microcell may cover an area in which vehicles typically move at a fast speed. Hence, such a vehicle stopped for some reason will not be accorded a call setup.

Figure 6:
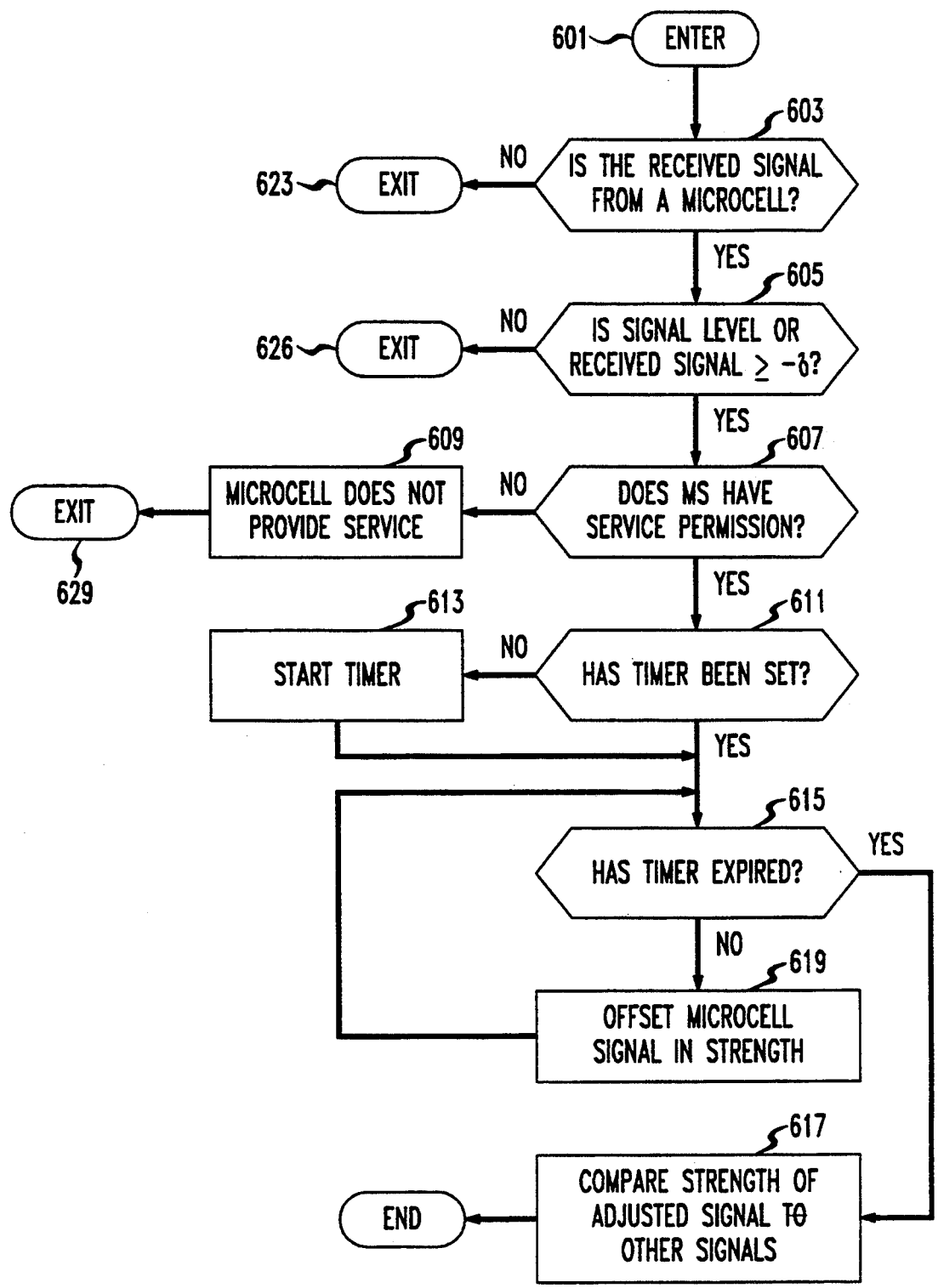
FIG. 6 is a flow diagram of a process for operating the apparatus of FIG. 5.

The operation of the system in determining access of a MS to proceed with a call setup with a microcell is shown by the flow diagram of FIG. 6. The process is entered at terminal 601 and in subsequent decision block 603 the MS determines if a received signal is from a microcell. If the signal received is not from a microcell the process exits at terminal 623. If the received signal is from a microcell the process flow proceeds to decision 605 which ascertains if the received signal strength is equal to or greater than the perceptible level designated as a negative delta. If the signal strength is less than the negative delta level the process is exited at terminal 626.

If the received signal meets this received negative delta signal strength criterion a subsequent decision 607 determines if the MS has service permission to set up a call with the microcell. Such service permission may be based on whether the MS is portable or vehicle based and is determined by an identification code included in the MS unit. If permission is denied the microcell does not provide service as per block 609 and the process is terminated in exit terminal 629.

If the MS has permission to be served by the microcell the decision 611 determines if the offset duration timer has been set. If not the instruction of block 613 starts the timer and proceeds to decision 615. If the timer has started the flow goes directly to decision 615 which evaluates if the timer has expired and the duration of the offset attained.

If the offset duration timer has expired the flow proceeds to the instruction 617 which specifies that the microcell signal strength be dealt with at its actual value in selecting a recipient for a call setup. If the timer has not expired the flow proceeds to the instruction 619 which treats the perceived microcell signal as a low strength signal relative to signals received from other sources. The flow in this instance returns to decision block 615 until the offset duration timer expires.

I claim:

1. A method for increasing traffic capacity in a wireless radiotelephone system having two tier cellular coverage of service areas including a macrocell including microcell station sites each of which have defined coverage areas within which service is extended to mobile subscriber (MS) radiotelephones;

comprising the steps of:
transmitting from a microcell station a broadcast signal for engaging a MS radiotelephone in an idle mode;
the MS radiotelephone responding to the broadcast signal at a specified threshold level at a distance "d" in advance of its entry into the coverage area of the microcell and initiating timing of an offset duration that expires at a time substantially coincident with entry of a MS radiotelephone with an expectant speed below a cutoff speed $v_F$ into the coverage area;
setting the cutoff speed $v_F$ for MS radiotelephones so that at this speed the MS radiotelephone enters the leaves the coverage area upon or before expiration of the offset duration;
denying call setup service with the microcell to all MS radiotelephones with an expectant speed equal to or greater than the cutoff speed $v_F$.

2. A method for increasing traffic capacity in a wireless radiotelephone system having tow tier cellular coverage of service areas as claimed in claim 1; and further comprising:
associating with each MS radiotelephone indicia that identify its expectant speed; and denying call setup service within the microcell all MS radiotelephones having an indicia indicating an expectant speed equal to or greater than the cutoff speed $v_F$.

3. A method for increasing traffic capacity in a wireless radiotelephone system having two tier cellular coverage of service areas as claimed in claim 1; and further comprising:
setting the distance "d" at a distance determined by an ability of a MS radiotelephone to detect the broadcast signal.

4. In a wireless communication system having two tier cellular systems having controlling macrocells and subsidiary microcells; a method for increasing traffic capacity in the wireless communication system
comprising the steps of:
determining an offset delay period as a function of a cut-off speed $v_F$ at which it is inappropriate for the microcell to service a mobile subscriber (MS) radiotelephone;
generating at the microcell a broadcast signal and broadcasting ht e broadcast signal from a transmit/receive station of the cellular system;
setting a detection threshold in the MS radiotelephone for responding to the broadcast signal; the threshold level representing an attenuation in the broadcast signal that represents a distance "d" from a boundary of the microcell at which a MS radiotelephone at cut-off speed enters and exits a coverage area of the microcell at or before expiration of the predetermined offset delay period;
having the MS radiotelephone initiate a start of the predetermined offset delay period upon receipt of the broadcast signal at the attenuation;
the distance being selected so that the offset delay period is initiated prior to entry of the MS radiotelephone into the coverage area of the microcell in order to minimize overlap between coverage area travel of the MS radiotelephone and offset delay period duration.

5. In a wireless communication system having two tier cellular systems having controlling macrocells and subsidiary microcells; a method as claimed in claim 4 for assigning MS radiotelephones to the most suitable tier; further comprising:
supplying the MS radiotelephone with identifying indicia of its expectant speed; and
denying service to MS radiotelephones whose identifying indicia specified an expected speed equal to or greater than the cutoff speed $v_F$.

6. In a wireless communication system having two tier cellular systems having controlling macrocells and subsidiary microcells; a method as claimed in claim 5 for assigning MS radiotelephones to the most suitable tier; further comprising:

setting the distance "d" at a distance determined by an ability of a MS radiotelephone to detect the broadcast signal.

7. In a wireless radiotelephone system with two tier cellular systems having a controlling macrocell and a microcell controlled by the macrocell and having a coverage area; a method for increasing traffic capacity in the wireless radiotelephone system comprising the steps of:

transmitting a broadcast signal from a transmitting apparatus of the microcell;

having a mobile subscriber (MS) radiotelephone respond to the broadcast signal at a reception signal level that occurs at a distance "d" prior to entry of the MS radiotelephone into a service coverage area so the microcell;

a receipt of the broadcast signal by the MS radiotelephone initiating timing of an offset time duration;

selecting the distance "d" and offset time duration that depends on a cutoff speed $v_F$ at which the MS radiotelephone enters and exits the coverage area of the microcell before service can be extended to it, and in which distance traveled within the coverage area by MS radiotelephones traveling below the cutoff speed $v_F$ is minimized prior to the expiration of the offset time duration, and having the MS radiotelephone perceive the microcell broadcast signal strength at reduced in strength during the offset time duration.

8. In a wireless radiotelephone system with two tier cellular systems having a controlling macrocell and a microcell controlled by the macrocell and having a controlled coverage area; a method as claimed in claim 7 for assigning an MS radiotelephone to the microcell; comprising the further steps of:

supplying the MS radiotelephone with identifying indicia of its expectant speed; and denying service to MS radiotelephones whose identifying indicia specifies a possible speed equal to or greater than the cutoff speed $v_F$.

9. In a wireless radiotelephone system with two tier cellular systems having a controlling macrocell and a microcell controlled by the macrocell and having a controlled coverage area; a method as claimed in claim 8 for assigning an MS radiotelephone to the microcell; comprising the further steps of:

setting the distance "d" at a distance determined by an ability of a MS radiotelephone to detect the broadcast signal.

* * * * *